United States Patent Office

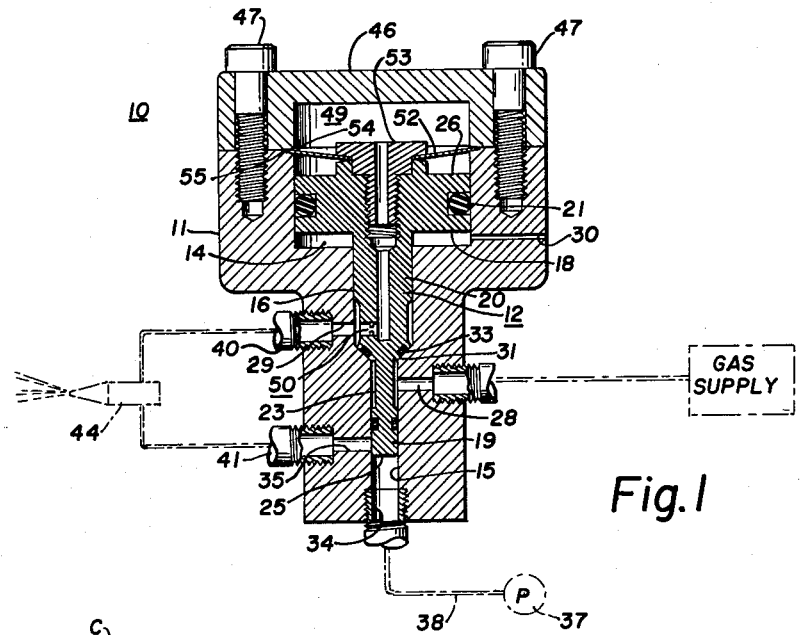
Fig.1
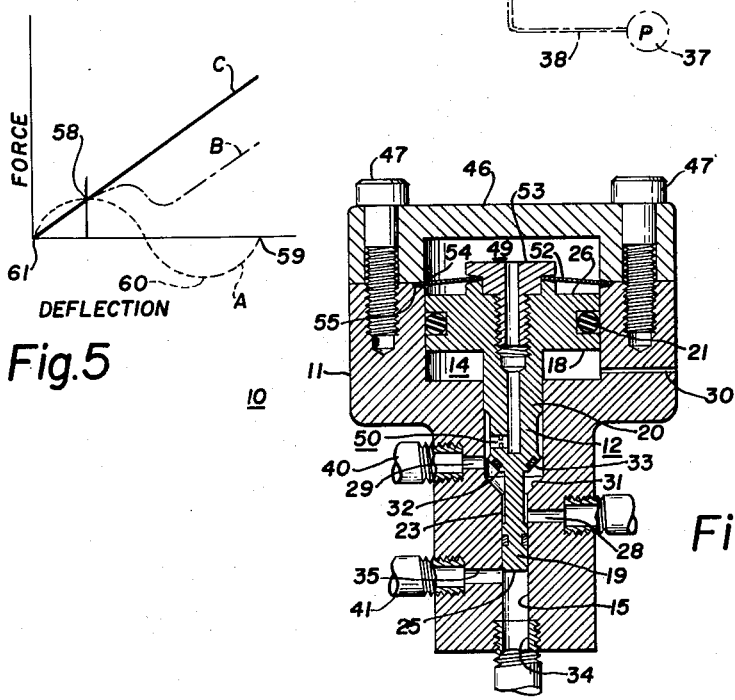
Fig.5
Fig.2
INVENTORS,
William R. Miller
George M. Lance INVENTORS,
William R. Miller
George M. Lance INVENTORS.
BY William R. Miller
George M. Lance INVENTORS,
BY William R. Miller
George M. Lance

3,099,282
Patented July 30, 1963

3,099,282
PRESSURE OPERATED VALVE MEANS FOR CONTROLLING FLOW IN A FLOW LINE
William R. Miller, 1289 Genesee St., Cleveland 24, Ohio, and George M. Lance, 1013 Nana Lane, St. Louis 22, Mo.
Filed May 18, 1959, Ser. No. 814,104
16 Claims. (Cl. 137—87)

The invention relates in general to valves and more particularly to spray control valves having means for positively insuring that the actuating fluid is shut off when the spray cycle is completed.

This application is a continuation-in-part application of Serial No. 591,969, filed June 18, 1956 for Valve, now abandoned.

In prior art spray valves a material to be dispensed, such as grease has been used to actuate the spray valve to an open position, in which position an actuating fluid such as air is allowed to pass through the spray valve to subsequently mix with and spray the grease on a deisred surface. Upon deactuation of the pumping source which is pumping the grease through the spray valve, spring means are utilized to push the spray valve back to a closed position whereat air is prevented from passing through the spray valve. It has been found however that because of a back pressure buildup in the grease line that the spring means which have been heretofore utilized to close the spray valve would not function properly and that the spray valve would be held open with subsequent expensive wastage of the actuating fluid.

It is therefore an object of this invention to provide a spray valve which will quickly and positively close when the spray cycle is completed thereby preventing the loss of actuating fluid.

Another object of the invention is to provide a valve which will open quickly when the spray cycle is commenced.

Another object of the invention is to provide spring means for holding the control valve in the open position.

Another object of the invention is to provide fluid pressure means to cooperate with spring means to positively close the valve after a spray cycle.

Another object of the invention is to provide a spray control valve which is interposed between an air line and a grease line which lines extend to a spray nozzle, which valve permits air to flow to the spray nozzle when grease is forced through the grease line.

Another object of the invention is to provide a device wherein actuating fluid is prevented from being dispensed except when dispensable material is being dispensed.

Another object of the invention is to provide a spray control device which prevents the waste of gas which is being used as the motive power to spray a flowable, dispensable material.

Another object of the invention is to provide a spray control device which moves quickly and positively from full open to full closed position when the spray cycle is complete.

Another object of the invention is to provide a valve which when opened by any number of means and which when opened and fluid flows therethrough will close after a predetermined period of time.

Another object of the invention is to provide a valve which is in effect closed by the flow of fluid therethrough.

Another object of the invention is to provide a valve which includes a piston movable back and forth between open and closed positions to control a substantially incompressible material with a means for providing a displacement for a portion of the material below an outlet port so the piston may substantially close.

Another object of the invention is to provide a spray valve which effectively blows itself open upon response to a predetermined pressure of dispensable material and which when closing is not materially affected by dispensable material in the dispensable material inlet.

Other objects and a fuller understanding of this invention may be had by referring to the following description and claims, taken in conjunction with the accompanying drawings, in which:

FIGURE 1 is a side elevational view in section of the spray valve of the present invention in the closed position;

FIGURE 2 is a view of the spray valve of FIGURE 1 except that the valve is in the open position;

FIGURE 5 is a force-deflection graph showing the force-deflection characteristics of three of the spring members which may be used in the present invention;

Figure 3:
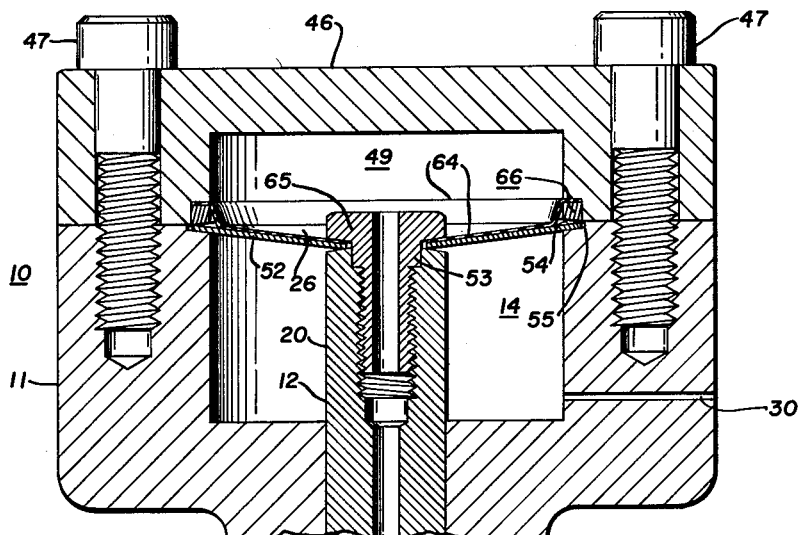
FIGURE 3 is an enlarged fragmentary view of a modification of the spray valve shown in FIGURES 1 and 2 wherein the piston head has been replaced by a resilient diaphragm member.

The spray valve of the present invention has been indicated generally by the reference numeral 10 and includes generally a valve body 11 and a piston member 12. The valve body 11 includes a piston head chamber 14 at one end portion thereof, a primary bore 15 at the opposite end portion thereof and a secondary bore 16 therebetween. The piston member 12 includes a piston head 18 slidably residing within the piston head chamber 14, a spool 19 slidably residing within the primary bore 15 and a stem member 20 slidably residing within the secondary bore 16. An O-ring 21 is secured to the periphery of the piston head to provide a good seal between the chamber 14 and the piston head 18. An opening 30 extends from the lower portion of the piston head chamber 14 to allow any pressure to escape from the lower side of the piston head so that downward movement of the piston head will not be opposed. The spool 19 has a reduced portion 23 which reduced portion forms a movable chamber with the side walls of the primary bore 15. The piston member 12 has first and second surfaces 25 and 26, respectively, with a surface on the spool comprising the first face 25 and a surface on the piston head comprising the second face 26. An actuating fluid inlet 28 is connected to the movable chamber 23 and an actuating fluid outlet 29 is connected to the secondary bore 16. The actuating fluid in most cases will be merely a pressurized source of air, but it should be readily recognized that many pressurized fluids may be used to serve as the motive force for spraying the dispensable material illustrated in this invention. Wall means 31 between the primary and secondary bore 15 and 16, respectively, form a valve seat and wall means 32 which extend between the spool 19 and the stem member 20 along with an O-ring 33 form a closure means. The piston member 12 is slidably movable between a first and second position. The first or closed position is shown in FIGURE 1 and the second or open position is illustrated in FIGURE 2. The piston member in the first or closed position shown in FIGURE 1 prohibits the passage of air from the actuating fluid inlet 28 to the actuating fluid outlet 29. A dispensable material inlet 34 is connected to the primary bore 15 and provides communication with the first face 25 of the piston member 12. For the sake of illustration of the preferred embodiment of this invention a dispensable material will be referred to as grease, but it should be readily recognized that paint and other similar materials may be utilized with the spray valve of the present invention. A dispensable material outlet 35 is connected to the primary bore 15.

A suitable pump 37 is provided for pumping grease through a conduit 38 and through the dispensable material inlet 34 and against the first face 25 of the piston member 12. Conduits 40 and 41, respectively, lead from the actuating fluid outlet 29 and the dispensable material outlet 35 to a spray head 44. The air and grease are mixed within the spray head 44 and the air serves as an actuating fluid to spray the grease against a bearing surface or other suitable place.

A cover 46 is suitably secured to the valve body 11 by screws 47 and serves to close and form the piston head chamber 14. The second face 26 of the piston member 12 and the second end portion of the valve body along with the cover 46 forms a compression or pressure chamber 49. Restricted passageway means 50 extend from the actuating fluid outlet 29 through the piston member 12 and up to the compression chamber 49. A spring member 52 is suitably secured to the central portion of the piston head 18 by means of a screw 53. The outer peripheral edge 54 of the spring member 52 resides within an annular groove 55 which is formed between the mating surfaces of the cover 46 and the top edge of the valve body 11.

In the preferred form of the invention; namely, that which is shown in FIGURES 1 and 2, the spring member 52 is a spring washer otherwise known as a Belleville washer having force-deflection characteristics such as that which is shown in curve A of FIGURE 5. The characteristics of Belleville springs or washers are known and are described more particularly on pages 242 through 244 of the book entitled, "Design of Machine Members" by Alex Vallance and Venton Doughtie, second edition, sixth impression, published by McGraw-Hill Book Company, Inc.

To describe the operation of the spray valve shown in FIGURES 1 and 2, let it be assumed that the spray valve 10 is in its closed position (FIGURE 1). The pump 37 is actuated by a suitable signal not shown which signal might be the movement of a press past a predetermined position which signals to the pump the desirability of grease being sprayed at that particular moment. The actuation of the pump causes grease to be transmitted through the conduit 38 and into the dispensable material inlet 34. Continued pumping of grease causes the grease to engage the first face 25 of the piston member 12 which causes the piston member 12 to move upwardly toward the position shown in FIGURE 2. When the piston member 12 and hence the portion of the spring member 52 which is attached to the piston head 18 has deflected or moved a distance on the curve A of FIGURE 5 which distance is the distance between points 61 and 58 on curve A as measured on the deflection axis of the graph, the action of the spring member 52 itself causes the central portion of the spring member 52 to move through its center position to the limit of its deflecting stroke without additional force on face 25 of the piston member 12 to the point indicated by the reference numeral 59 on curve A of FIGURE 5. When the spring member 52 has deflected to point 59 the piston member 12 is in the open position which is illustrated in FIGURE 2. When the piston member 12 has moved to the open position (FIGURE 2) grease travels through the dispensable material inlet 34 and out through the dispensing material outlet 35, through the conduit 41 to the spray head 44. Simultaneously air travels from the air supply source through the actuating fluid inlet 28 through the movable chamber 23, into the secondary bore 16 and out through the actuating fluid outlet and to the spray head 44 by way of the conduit 40. When it reaches the spray head 44, it acts as the motive force to dispense and spray the grease. While the air is thus flowing to the spray head it is also bleeding into the compression chamber 49 by way of the restricted passageway means 50 which lead from the actuating fluid outlet through the piston member 12 to the compression chamber 49. Thus while the spray valve is in the open position a pressure is being built up in the compression chamber 49 which acts on the second face 26 of the piston member 12 and exerts a force tending to move the piston member to the closed position (FIGURE 1). When the pump means is deactuated and ceases to pump grease, the pressure exerted against the first face 25 of the piston member is thereby released. At this moment the pressure which has been built up in the compression chamber 49 and which is exerting a force on the second face 26 of the piston member acts on the piston member to move the Belleville washer from point 59 on curve A to a point indicated by the reference numeral 60. When the Belleville washer has deflected to point 60 it continues deflecting without further force being exerted thereon back to the intersection of the force-deflection axes or point 61 on curve A. The force exerted by the air pressure in the compression chamber 49 aids in moving the piston member 12 to the closed position (FIGURE 1) even after the Belleville washer has deflected past point 60 on curve A. This action snaps or moves the piston member 12 positively and quickly to the closed position and when in this position the air supply is prevented from passing to the supply head 44. This insures that there will be no leakage or loss of the actuating fluid because the action of the pressure in the compression chamber 49 and the action of the Belleville washer serve to quickly and positively close the spray valve even if a certain amount of back pressure has been built up in the supply line 38 leading from the pump 37 into the primary bore 15.

Curve B in FIGURE 5 has been shown to illustrate another type of Belleville washer which can be used in place of the washer having the characteristics shown in curve A and which is desirable for certain types of operations.

Figure 4:
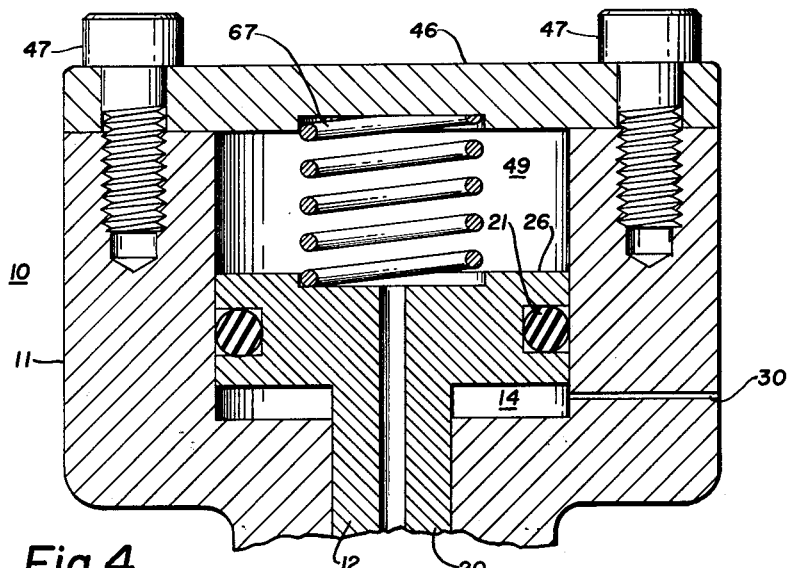
FIGURE 4 is an enlarged fragmentary view of another modification of the spray valve showing the use of a different spring member than that used in FIGURES 1 through 3.

FIGURE 3 shows a modification of the present invention wherein the piston head 18 which has been shown in FIGURES 1, 2 and 4 has been substituted by a desilient diaphragm 64. The diaphragm 64 is preferably bonded to the Belleville washer 52. The diaphragm 64 is suitably secured to the stem member 20 by means of a screw 65 and has its outer periphery secured to the walls of the compression chamber 49 as at 66. With the use of a diaphragm 64 the piston head 18 shown in FIGURES 1, 2 and 4 can be eliminated thereby obviating the necessity of keeping a close tolerance between the piston head 18 and the piston head chamber 14. It also obviates the necessity of the O-ring 21 which has been provided on the piston head 18.

FIGURE 4 illustrates another modification of the invention wherein the Belleville washers which have been shown and illustrated in FIGURES 1, 2 and 3 have been substituted by the usual type of compression spring 67 and are those which generally have the characteristics as indicated by curve C of FIGURE 5. For some types of operation this spring 67 is satisfactory in the operation of the spray valve shown in this invention, but it does not provide the quick snap action which is obtained with the use of a Belleville washer having the characteristics of curve A in FIGURE 5. The force exerted by the pressure in the compression chamber along with the force of the spring will cooperate to close the valve under many operating conditions.

Figure 6:
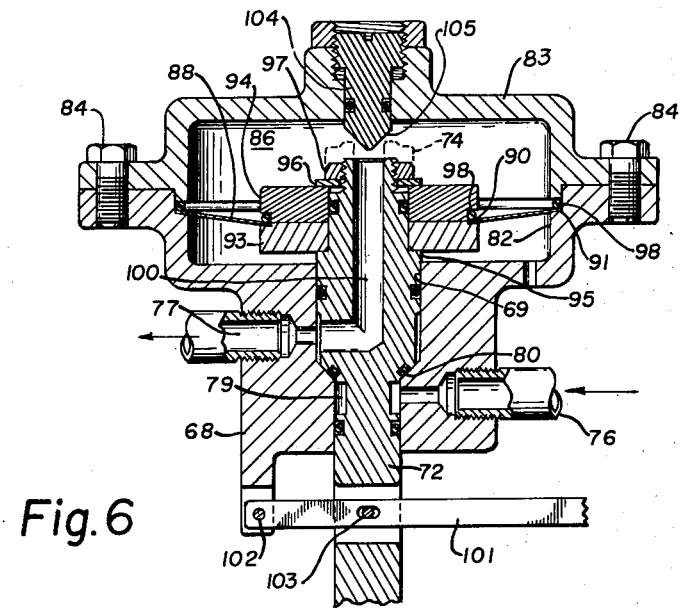
FIGURE 6 is a side elevational view in section of a valve of the present invention which has been modified from the valve shown in FIGURES 1 and 2.
Figure 9:
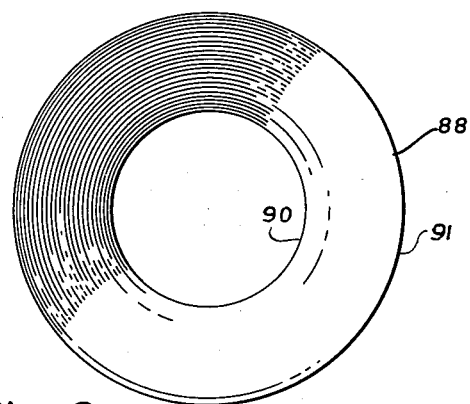
FIGURE 9 is a view of the Belleville spring washer used in the valves of FIGURES 1, 2, 6, 7, and 8 and removed therefrom.

FIGURE 6 discloses the same principle of operation as disclosed in the valves of FIGURES 1 and 2, however a modification of the structure is disclosed in this valve. The valve shown in FIGURE 6 includes in combination a valve body 68 having a bore 69 therein. A piston 72 is positioned in the bore and is movable between first and second positions. The first position is illustrated by the full line drawing of FIGURE 6 whereas the second position is indicated by the dotted line position 74. Fluid inlet conduit means and fluid outlet conduit means 76 and 77, respectively, communicate with the bore 69. The piston 72, while in the first position (full line) prevents fluid communication between the fluid inlet and fluid outlet whereas in the second position (dotted line 74) permits fluid communications between the fluid inlets and outlets by way of an undercut portion 79 on the piston 72. In the first or closed position of the piston flow is prevented by way of a valve seat 80 which includes an O-ring. Wall means 82, which include a cap 83 secured to the valve body by bolts 84, are provided and define a chamber 86 at the upper end portion of the piston 72. A Belleville spring washer 88 is positioned in the chamber 86 and includes a continuous annular ring of material (FIGURE 9) defined by inner and outer perimeters 90 and 91, respectively. The outer perimeter 91 of the Belleville spring washer is substantially fixedly connected to the walls which define the chamber 86 by means of an undercut portion on the valve body which mates with a similar portion on the cap. The inner perimeter 90 of the Belleville spring washer is secured to the upper end portion of the piston 72 by means of sandwiching the same between first and second members 93 and 94. These two members are held in their sandwiched together position by means of the lowermost member engaging a shoulder 95 on the piston and at the upper end a washer 96 and a threaded nut member 97. O-rings 98 maintain the chamber 86 above the Belleville washer in a substantially airtight condition. The Belleville spring washer has the characteristics disclosed in curve A shown in FIGURE 5. That is with the outer perimeter of the washer held substantially stationary as shown in FIGURE 6, the inner perimeter portion is movable through center from the first position in which it is shown in FIGURE 6 upwardly to a second position (similar to that position shown in FIGURE 2) by the exertion of a force thereon and when the spring has arrived at this position, it will remain there until the application of a force in a reverse direction to make it move back through center from the second position to the first position. Passageway means 100 are provided and extend from the fluid outlet conduit means or the outlet side of the valve 77 to the chamber 86. Means are provided for moving the piston 72 and the Belleville spring washer 88 from the above referred to first positions to their respective second positions. This means includes a manually operable lever 101 pivotally connected as at 102 to a portion of the valve body and also connected to the piston 72 by a sliding pivotal connection 103.

In operation, in order to permit the flow of fluid (either liquid or gas) from the inlet to the outlet conduit, it is necessary to manipulate the lever 101 which moves the piston and Belleville spring washer to their open position (dotted line 74). In this position, flow is permitted from the inlet 76 to the outlet 77 and at this time fluid also flows through the passageway means 100 to the chamber 86. After flow has continued to the chamber 86 for a predetermined period of time, a predetermined pressure is built up in the chamber and this will produce the above referred to reverse force which will cause the Belleville spring washer and the piston which is connected thereto to move to their respective first positions (full line drawing) at which position fluid is prevented from flowing from the inlet 76 to the outlet 77.

It will be noted that a means for restricting the flow through the passageway means has been provided and takes the physical form of a threadably adjustable member 104 which is provided with a conical end portion 105. It will be noted that when the piston moves to the second or uppermost position, there is a predetermined area through which fluid may flow from the passageway means into the chamber 86. If it is desired to decrease the rate of flow, it is only necessary to screw the member 104 downwardly to reduce the above referred to area when the piston is in the second or open position. If it is desired to increase the flow then the member 104 is moved upwardly thereby increasing the effective flow area. The utility of the valve will be readily apparent in innumerable instances when it is desired to have flow of a fluid for only a predetermined period of time after which time it is desirable to have the flow cease. An example of such a valve would be such as a hand operated flush valve such as is commonly utilized in rest rooms.

Figure 7:
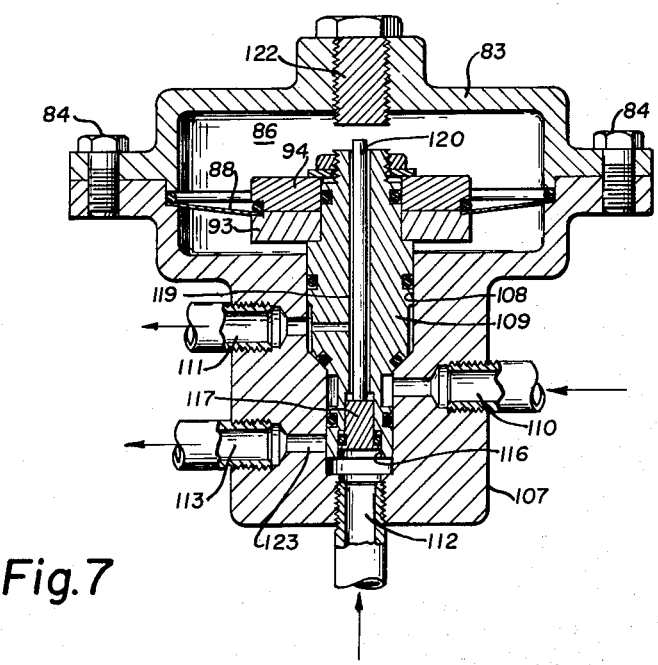
FIGURE 7 is a side elevational view of another modification of the valve shown in FIGURES 1 and 2.

The valve illustrated in FIGURE 7 operates basically on the same principle as the valve shown in FIGURES 1 and 2, however has an extra provision built in to aid in the operation thereof under some extreme conditions. The valve shown in FIGURE 7 substantially overcomes the problem involved when a substantially incompressible material is being dispensed by the pump 37 through conduit 38 and into the inlet 34 and is then stopped (FIGURE 2) after which the valve is in condition to be closed. If the pump is located quite close to the inlet 34 or if a check valve is interposed in the line 38 and prevents the backing up of the lubricant in line 38, then the piston when it moves downwardly and after it just covers the outlet port 35 will have a tendency not to move any further because it must compress a substantially incompressible material in the inlet 34. As a result, sometimes under these extreme conditions the piston is prevented from completely closing and as a result gas for example, air, continues to bleed through the valve from the gas inlet 28 to the gas outlet 29. The structure shown and disclosed in FIGURE 7 is designed to substantially overcome this problem.

The valve shown in FIGURE 7 includes a valve body 107 having a bore 108 therein similar to the other valves described. A piston 109 is located in the bore and is movable between first and second positions and is provided with upper and lower end portions. Fluid inlet and outlet conduits 110 and 111 communicate with the bore as well as dispensible material inlets and outlets 112 and 113. The dispensible material inlet 112 also communicates with the lower end portion of the piston 109 as in the valve of FIGURES 1 and 2. The piston in its lowermost position prevents flow between the respective inlets and outlets and in its upper or open position permits flow between the respective inlets and outlets above referred to. The lowermost or first end portion of the piston 109 is provided with a cylinder 116 in which an auxiliary piston 117 is adapted to travel between upper and lower or first and second positions. The valve shown in FIGURE 7 is constructed with a chamber as disclosed in the discussion of the valve of FIGURE 6 as well as a similar Belleville spring washer. The Belleville spring washer is secured in the chamber and to the upper portion of piston 109 in the same manner as the valve of FIGURE 6 and so a further detailed discussion of this valve will not be resorted to. Passageway means 119 are provided in the piston and permit fluid communication between the fluid outlet conduit 111 and the chamber 86. A rod 120 extends axially through the piston 109 and the upper end of the rod extends into the chamber 86 and the lower end of the rod is engageable with the auxiliary piston. An adjustable abutment 122 is provided in the cap 83 of the device and is positioned so as to engage the upper end of the rod when the piston 109 moves to the open or uppermost position.

In operation, assume that a pump similar to that shown in FIGURE 1 has started to introduce dispensible material such as a lubricant into the inlet 112. The pressure of the lubricant builds up to a point to produce the force required to move the Belleville washer into its through-center movement which causes the washer and the piston 109 to move to their second or uppermost positions. When they have moved to their uppermost positions, the bottom edge of the piston 109 clears the upper portion of the port 123 which forms a part of the dispensible material outlet 113. On the upward movement of the piston, the upper end of the rod 120 engages the adjustable abutment 122 and causes the rod to push the auxiliary piston 117 down to its lowermost position or at a place where it is substantially flush with the lower edge of the piston 109. As soon as the piston 109 moves to its open or uppermost position, fluid such as gas flows from the fluid inlet 110 to the outlet 111 and also flows through the passageway means 119 into the chamber 86 resulting in a pressure build-up in chamber 86. When the pressure is built up sufficiently, the piston is moved toward the closed or lowermost position and when the bottom edge of the piston just passes the lowermost edge of port 123, the substantially incompressible lubricant which is trapped therein causes upward movement of the auxiliary piston to the position shown in FIGURE 7 to provide a place for the material trapped below the port 123. This permits under most conditions, a substantial closing of the piston 109 which prohibits further flow from the fluid inlet to the outlet. The continual movement of the rod 120 within the portion of the passageway means 119 through which it extends serves as a self-cleaning action which keeps foreign material from clogging up the passageway means. The action of the fluid on the top of the auxiliary piston 117 when the piston 109 is open, also aids the rod in moving the auxiliary piston downwardly. It may therefore be said that means are provided for moving the auxiliary piston to one of its positions upon opening of piston 109.

Figure 8:
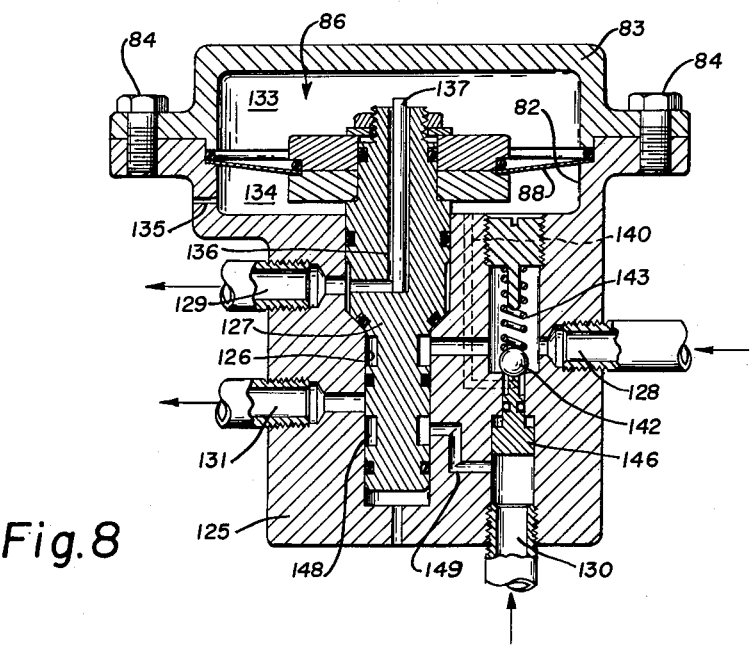
FIGURE 8 is a side elevational view of another modification of the valve shown in FIGURES 1 and 2.

FIGURE 8 illustrates another modification of a valve similar in operation to that shown in FIGURES 1, 2 and 7. The valve of FIGURE 8, although capable of handling many materials, will be specifically described as a lubricant spray valve. This valve comprises in combination a valve body 125 having a bore 126 and a piston 127 movable in the bore between closed and open positions which in FIGURE 8 are the lower and uppermost positions. Gas inlet and outlet conduit means 128 and 129 respectively, are provided and communicate with the bore 126 as do lubricant inlet and outlet conduit means 130 and 131, respectively. The piston 127 in the first or lowermost position prevents communication between the gas inlet and outlet as well as preventing communication between the lubricant inlet and outlet. In the second or uppermost condition the piston permits communication between the gas inlet and outlet and between the lubricant inlet and outlet. A chamber 86 is also formed in the upper portion of the valve as in the valve of FIGURES 6 and 7 and a Belleville spring washer is also located therein and is attached to the upper portion of the piston in the same manner as the valves of FIGURES 6 and 7. The upper or first end portion of the piston and the Belleville spring washer divide the chamber 86 into upper and lower portions 133 and 134, respectively. An opening 135 extends between the lower portion 134 of the chamber through the wall of the valve body to the atmosphere. Passageway means 136 extend from the gas outlet 129 to the upper portion 133 of the chamber 86. A rod 137 is located in the passageway means and provides a convenient way of metering flow to the upper portion 133 of the chamber 86. A conduit 140 provides communication between the lower portion 134 of the chamber 86 and the gas inlet 128. Valve means are provided which includes a ball 142 biased to a close position by a spring 143. The valve means are therefore normally closed and prevent communication through the conduit 140. In order to open the normally closed valve means, it is necessary to have a pressure built up in the lubricant inlet 130 which in turn causes a secondary piston 146 to move upwardly to move the ball 142 off its seat against the biasing of spring 143. This causes gas to pass through conduit 140 to the lower portion 134 of the chamber 86.

In operation, the lubricant inlet is connected to a pump or similar device and in order to operate the valve it is necessary that lubricant be forced under pressure into the lubricant inlet 130. Lubricant enters an undercut portion 148 on the piston 127 by way of a passage 149. It will be observed that pressurized lubricant in the undercut portion 148 will have no effect upon the piston 127. The pressurized lubricant will cause the ball 142 or the valve means to open and gas or air under pressure will move through the conduit 140 to the underside of the Belleville washer. Upon sufficient gas pressure build-up in the lower portion 134, the Belleville washer will be caused to move to its uppermost or second position carrying the piston 127 with it. This will then permit the passage of lubricant from the undercut portion 148 through the lubricant outlet 131. The passage of lubricant from the inlet 130 through the outlet 131 reduces the pressure in the lubricant inlet which permits the ball 142 to reseat and therefore causes shutting off of gas under pressure to the underside of the Belleville spring washer. The pressurized gas on the underside of the Belleville spring washer will vent to the atmosphere through the opening 135. Since the Belleville is of the type described in curve A of FIGURE 5, it will stay in its uppermost position until a reverse force is applied thereto. The reverse force is provided since pressurized gas flows from the gas inlet 128 to the gas outlet 129 and also into the upper portion 133 of the chamber 86. When sufficient pressure has built up in the upper portion 133, the piston and Belleville spring washer will be moved to their lowermost or second positions thereby cutting off flow through the valve. It will be noted that in the valve shown in FIGURE 8 that when a substantially incompressible material such as a lubricant is utilized, this material will afford no resistance to the closing movement of the piston 127 since the pressurized lubricant is in the undercut portion 148 which does not cause a force to move the piston in either direction.

It will thus be seen that valves have been provided which will quickly and positively move to the open position and which will remain in this position until it is desired that the valve be closed. Upon closing the valve moves quickly and positively to the closed position even though a certain amount of back pressure has been built up in the line which supplies the grease or dispensable material to the valve and as a result of this the fluid which is spraying the dispensable material will not be wasted but will only be used when grease is being supplied to the spray head 44.

In other modifications of the valve it will be seen that a predetermined flow may be accomplished for a determined and variable time. Flow through the valve in effect shuts the valve off. The other modifications provide valves which solve the difficult problems encountered in using and dispensing incompressible materials.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A spray valve comprising a valve body having a chamber at one end portion thereof, a primary bore at the other end portion thereof and a secondary bore therebetween, a piston member including an end portion, residing within said chamber, a spool slidably residing within said primary bore and a stem member slidably residing within said secondary bore, said spool having a reduced portion forming a movable chamber with the side walls of said primary bore, said piston member having first and second faces with a surface on said spool comprising said first face and a surface on said piston head comprising said second face, a gas inlet connected to said movable chamber, a gas outlet connected to said secondary bore, wall means between said primary and said secondary bore forming a valve seat and wall means between said spool and said stem forming closure means, said piston member slidably movable between a first and a second position, said piston member in said first position prohibiting passage of gas from said gas inlet to said gas outlet, a dispensable material inlet connected to said primary bore providing communication with said first face of said piston member, a dispensable material outlet connected to said primary bore, said piston member in said first position prohibiting communication between said dispensable material inlet and said dispensable material outlet, restricted passageway means extending within said piston member and providing communication between said gas outlet and said chamber, a spring member residing within said compression chamber and being operably connected to said piston member for urging said piston member to said first position, pump means for urging dispensable material into said dispensable material inlet and exerting a force against said first face of said piston member thereby moving said piston member to said second position whereby dispensable material travels through said dispensable material outlet and gas flows from said movable chamber past said seal means to said gas outlet and bleeds through said restricted passageway means to said chamber, deactuation of said pump means causing said force to be removed from said first face of said piston member whereby said gas pressure in said chamber and said spring member move said piston member back to said first position whereby gas is prevented from passing from said gas inlet to said gas outlet.

2. A spray valve comprising a valve body having a chamber at one end portion thereof, a primary bore at the other end portion thereof and a secondary bore therebetween, a piston member including an end portion residing within said chamber, a spool slidably residing within said primary bore and a stem member slidably residing within said secondary bore, said spool having a reduced portion forming a movable chamber with the side walls of said primary bore, said piston member having a first face with a surface on said spool comprising said first face, a gas inlet connected to said movable chamber, a gas outlet connected to said secondary bore, wall means between said primary and said secondary bore forming a valve seat and wall means between said spool and said stem forming closure means, said piston member slidably movable between a first and a second position, said piston member in said first position prohibiting passage of gas from said gas inlet to said gas outlet, a dispensable material inlet connected to said primary bore and providing communication with said first face of said piston member, a dispensable material outlet connected to said primary bore, said piston member in said first position prohibiting communication between said dispensable material inlet and said dispensable material outlet, said piston in said second position permitting passage of gas between said gas inlet and said gas outlet and permitting passage of dispensable material between said dispensable material inlet and outlet, restricted passageway means extending within said piston member and providing communication between said gas outlet and said chamber, a spring member residing within said compression chamber and being operably connected to said piston member for urging said piston member to said first position, pump means for urging dispensable material into said dispensable material inlet and exerting a force against said first face of said piston member.

3. A valve comprising a valve body having a chamber at one end portion thereof, a primary bore at the other end portion thereof and a secondary bore therebetween, a piston member having an end portion residing within said chamber, a spool slidably residing within said primary bore and a stem member slidably residing within said secondary bore, said spool having a reduced portion forming a movable chamber with the side walls of said primary bore, said piston member having a first face with a surface on said spool comprising said first face, a gas inlet connected to said movable chamber, a gas outlet connected to said secondary bore, wall means between said primary and said secondary bore forming a valve seat and wall means between said spool and said stem forming closure means, said piston member slidably movable between a first and a second position, said piston member in said first position prohibiting passage of gas from said gas inlet to said gas outlet, a dispensable material inlet connected to said primary bore and providing communication with said first face of said piston member, a dispensable material outlet connected to said primary bore, said piston member in said first position prohibiting communication between said dispensable material inlet and said dispensable material outlet, said piston member in said second position permitting communication between said gas inlet and outlet and between said dispensable material inlet and outlet, restricted passageway means extending within said piston member and providing communication between said gas outlet and said chamber, a spring member in said compression chamber and operably connected to said piston member, said spring member movable from a first to a second position by the exertion of a force thereon and requiring a reverse force to move it from said second to said first position, pump means for urging dispensable material into said dispensable material inlet and exerting a force against said first face of said piston member thereby moving said piston member to said second position whereby dispensable material travels through said dispensable material outlet and gas flows from said movable chamber past said seal means to said gas outlet and bleeds through said restricted passageway means to said chamber, deactuation of said pump means causing said force to be removed from said first face of said piston member whereby said gas pressure in said compression chamber and said spring member move said piston member back to said first position whereby gas is prevented from passing from said gas inlet to said gas outlet.

4. A spray valve comprising a valve body having a chamber at one end portion thereof, a primary bore at the other end portion thereof and a secondary bore therebetween, a piston member including a resilient diaphragm having the periphery thereof secured to the walls of said chamber and residing within said chamber, spools slidably residing within said primary bore and a stem member slidably residing within said secondary bore, said stem member connected to said diaphragm, said spool having a reduced portion forming a movable chamber with the side walls of said primary bore, said piston member having first and second faces with a surface on said spool comprising said first face and a surface on said resilient diaphragm comprising said second face, a gas inlet connected to said movable chamber, a gas outlet connected to said secondary bore, wall means between said primary and said secondary bore forming a valve seat and wall means between said spool and said stem forming closure means, said piston member slidably movable between a first and a second position, said piston member in said first position prohibiting passage of gas from said gas inlet to said gas outlet and in the second position permitting passage of gas, a dispensable material inlet connected to said primary bore and providing communication with said first face of said piston member, a dispensable material outlet connected to said primary bore, said piston member in said first position prohibiting communication between said dispensable material inlet and said dispensable material outlet and in the second position permitting passage of dispensable material, restricted passageway means extending within said piston member and providing communication between said gas outlet and said chamber, a spring member residing within said chamber and being operably connected to said piston member for urging said member to said first position, pump means for urging dispensable material into said dispensable material inlet and exerting a force against said first face of said piston member thereby moving said piston member to said second position whereby dispensable material travels through said dispensable material outlet and gas flows from said movable chamber past said seal means to said gas outlet and bleeds through said restricted passageway means to said chamber, deactuation of said pump means causing said force to be removed from said first face of said piston member whereby said gas pressure in said chamber and said spring member move said piston member back to said first position whereby gas is prevented from passing from said gas inlet to said gas outlet.

5. A valve comprising a body having first and second end portions and having a bore therein, a piston member residing within said bore and having first and second faces, said piston member movable between a first and a second position, said piston member having a reduced portion between said first and second faces forming a movable chamber with the side walls of said bore, a gas inlet connected to said movable chamber, a gas outlet connected to said bore, said piston member in said first position prohibiting passage of gas from said gas inlet to said gas outlet and permitting passage of gas in said second position, a dispensable material inlet connected to said bore and providing communication with said first face of said piston member, a dispensable material outlet connected to said bore, said piston member in said first position prohibiting communication between said dispensable material inlet and said dispensable material outlet and permitting passage of dispensable material in said second position, a chamber at said second face of said piston member, restricted passageway means extending within said piston member and providing communication between said gas outlet and said chamber, a spring member residing within said chamber for urging said piston member to said first position, pump means for urging dispensable material into said dispensable material inlet and thereby exerting a force against said first face of said piston member thereby moving said piston member to said second position whereby dispensable material travels out said dispensable material outlet and gas flows from said movable chamber to said gas outlet and bleeds through said restricted passageway means to said chamber, deactuation of said pump means causing said force to be removed from said first face of said piston member whereby said gas pressure in said chamber and said spring member move said piston member back to said first position whereby gas is prevented from passing from said gas inlet to said gas outlet.

6. A control valve comprising a body having first and second end portions and having a bore therein, a piston member residing within said bore and having first and second faces, said piston member movable between a first and a second position, said piston member having a reduced portion between said first and second faces forming a movable chamber with the side walls of said bore, a gas inlet connected to said movable chamber, a gas outlet connected to said bore, said piston member in said first position prohibiting passage of gas from said gas inlet to said gas outlet and in said second position permitting passage of gas from said gas inlet to said gas outlet, a dispensable material inlet connected to said bore and providing communication with said first face of said piston member, a dispensable material outlet connected to said bore, said piston member in said first position prohibiting communication between said dispensable material inlet and said outlet and in said second position permitting communication between said dispensable material inlet and said outlet, a chamber at said second face of said piston member, restricted passageway means extending within said piston member and providing communication between said gas outlet and said chamber, a spring member operably connected to said piston member for moving said piston member to said first position, pump means for urging dispensable material into said dispensable material inlet and thereby exerting a force against said first face of said piston member thereby moving said piston member to said second position.

7. A control valve comprising a body having first and second end portions and having a bore therein, a piston member residing within said bore and having first and second faces, said piston member movable between a first and a second position, said piston member having a reduced portion between said first and second faces forming a movable chamber with the side walls of said bore, a gas inlet connected to said movable chamber, a gas outlet connected to said bore, said piston member in said first position prohibiting passage of gas from said gas inlet to said gas outlet and in said second position permitting the passage of gas, a dispensable material inlet connected to said bore and providing communication with said first face of said piston member, a dispensable material outlet connected to said bore, said piston member in said first position prohibiting communication between said dispensable material inlet and said outlet and in said second position permitting communication therebetween, a chamber at said second face of said piston member, restricted passageway means extending within said piston member and providing communication between said gas outlet and said chamber, a spring member in said compression chamber and operably connected to said piston member, said spring member movable from a first to a second position by the exertion of a force thereon and requiring reverse force to move it from said second to said first position, pump means for urging dispensable material into said dispensable material inlet and thereby exerting a force against said first face of said piston member thereby moving said piston member to said second position whereby dispensable material travels out said dispensable material outlet and gas flows from said movable chamber to said gas outlet and bleeds through said restricted passageway means to said chamber, deactuation of said pump means causing said pressure to be removed from said first face of said piston member whereby said gas pressure in said chamber and said spring member move said piston member back to said first position whereby gas is prevented from passing from said gas inlet to said gas outlet.

8. A valve comprising a body having first and second end portions and having a bore therein, a piston member residing within said bore and having first and second end portions, said piston member movable between a first and a second position, a gas inlet connected to said bore, a gas outlet connected to said bore, said piston member in said first position prohibiting passage of gas from said gas inlet to said gas outlet and in said second position permitting passage of gas, a dispensable material inlet connected to said bore and providing communication with said first end portion of said piston member, a dispensable material outlet connected to said bore, said piston member in said first position prohibiting communication between said dispensable material inlet and dispensable material outlet and in said second position permitting communication therebetween, wall means at said second end portion of said body forming a compression chamber, passageway means extending between said gas outlet and said compression chamber, a spring member residing within said compression chamber and cooperating with said piston member to move the same, means for urging dispensable material into said dispensable material inlet and thereby exerting a force against said first end portion of said piston member thereby moving said piston member to said second position whereby dispensable material travels through said dispensable material outlet and gas flows from said gas inlet to said gas outlet and through said passageway means to said compression chamber, deactuation of said means for urging dispensable material causing said force to be removed from said first end portion of said piston member whereby gas pressure in said compression chamber and said spring member moves said piston member back to said first position whereby gas is prevented from passing through said gas inlet to said gas outlet.

9. A valve comprising in combination a valve body having a bore therein, a piston in said bore and movable between first and second positions, fluid inlet conduit means communicating with said bore, fluid outlet conduit means communicating with said bore, said piston in said first position preventing fluid communication between said fluid inlet conduit means and said fluid outlet conduit means and in said second position permitting fluid communication therebetween, wall means defining a chamber in said valve body at one end portion of said piston, a Belleville spring washer in said chamber, said Belleville spring washer including a continuous annular ring of material defined by inner and outer perimeters, said outer perimeter being substantially fixedly connected to said walls of said chamber, said inner perimeter being connected to said one end portion of said piston and being movable therewith, said Belleville spring washer having the characteristic of being movable through center from a first to a second position by the exertion of a force thereon and remaining there until the application of a reverse force to move it back through center from said second to said first position, restricted passageway means from said fluid outlet conduit means to said chamber, and means for moving said piston and Belleville spring washer to their respective second positions whereat fluid flows from said fluid inlet to said fluid outlet conduit means and also through said passageway means to said chamber thereby building up a pressure to produce said reverse force which causes said Belleville spring washer and said piston connected thereto to move to their respective first positions whereat fluid is prevented from flowing from said fluid inlet to said fluid outlet conduit means.

10. A valve comprising in combination a valve body having a bore therein, a piston in said bore and movable between first and second positions, said piston having first and second end portions, fluid inlet conduit means and fluid outlet conduit means communicating with said bore, dispensable material inlet conduit means communicating with said bore and said first end portion of said piston, dispensable material outlet conduit means communicating with said bore, said piston in said first position preventing communication between said fluid inlet and outlet conduit means and between said dispensable material inlet and outlet conduit means, said piston in said second position permitting communication between said fluid inlet and outlet conduit means and between said dispensable material inlet and outlet conduit means, wall means defining a cylinder in said first end portion of said piston, an auxiliary piston in said cylinder and movable between first and second positions, wall means defining a chamber at said second end portion of said piston, a Belleville spring washer in said chamber, said Belleville spring washer including a continuous annular ring of material defined by inner and outer perimeters, said outer perimeter being substantially fixedly connected to said walls of said chamber, said inner perimeter being connected to said second end portion of said piston and being movable therewith, said Belleville spring washer having the characteristic of being movable through center from a first to a second position by the exertion of a force thereon and remaining there until the application of a reverse force to move it back through center from said second to said first position, passageway means from said fluid outlet conduit means to said chamber, a rod extending axially through said piston with one end portion extending into said chamber and said other end portion engageable with said auxiliary piston, adjustable abutment means in said chamber engageable with said rod, introduction of dispensable material into engagement with said first end portion of said piston producing said force to move said piston and said Belleville spring washer to their said respective second positions which causes said rod to engage said adjustable abutment means and push said auxiliary piston to its said second position, said piston in said second position permitting flow of fluid and dispensable material through respective inlet and outlet conduits and flow of fluid through said passageway means to said chamber thereby building up a pressure to produce said reverse force which causes said Belleville spring washer and said piston connected thereto to move to their respective first positions which causes dispensable material below said dispensable material outlet conduit means to cause said auxiliary piston to move from said first to said second position.

11. A valve comprising in combination a valve body having a bore therein, a piston in said bore and movable between first and second positions, said piston having first and second end portions, fluid inlet conduit means and fluid outlet conduit means communicating with said bore, dispensable material inlet conduit means communicating with said bore and said first end portion of said piston, dispensable material outlet conduit means communicating with said bore, said piston in said first position preventing communication between said fluid inlet and outlet conduit means and between said dispensable material inlet and outlet conduit means, said piston in said second position permitting communication between said fluid inlet and outlet conduit means and between said dispensable material inlet and outlet conduit means, wall means defining a cylinder in said first end portion of said piston, an auxiliary piston in said cylinder and movable between first and second positions, wall means defining a chamber at said second end portion of said piston, a spring member in said chamber operatively connected to said piston, said spring member having the characteristic of being movable through center from a first to a second position by the exertion of a force thereon and remaining there until the application of a reverse force to move it back through center from said second to said first position, passageway means from said fluid outlet conduit means to said chamber, a rod extending axially through said piston with one end portion extending into said chamber and said other end portion engageable with said auxiliary piston, and abutment means in said chamber engageable with said rod.

12. A lubricant spray valve comprising in combination a valve body having a bore therein, a piston in said bore having first and second end portions and movable between first and second positions, gas inlet and outlet conduit means communicating with said bore, lubricant inlet and outlet conduit means communicating with said bore, said piston in said first position preventing communication between said gas inlet and outlet conduit means and between said lubricant inlet and outlet conduit means, said piston in said second position permitting communication between said gas inlet and outlet conduit means and between said lubricant inlet and outlet conduit means, wall means defining a chamber at said first end portion of said piston, a Belleville spring washer in said chamber, said Belleville spring washer including a continuous annular ring of material defined by inner and outer perimeters, said outer perimeter being substantially fixedly connected to said walls of said chamber, said inner perimeter being connected to said first end portion of said piston and being movable therewith, said first end portion of said piston and said Belleville spring washer dividing said chamber into upper and lower portions, means for venting said lower portion of said chamber to atmosphere, said Belleville spring washer having the characteristic of being movable through center from a first to a second position by the exertion of a force thereon and remaining there until the application of a reverse force to move it back through center from said second to said first position, passageway means from said gas outlet conduit means to said upper portion of said chamber, a conduit providing communication between said lower portion of said chamber and said gas inlet, valve means normally closed to prevent communication through said conduit, said valve means being opened upon a predetermined pressure in said lubricant inlet conduit means which permits flow of gas to said lower portion of said chamber which produces said force to move said Belleville spring washer and said piston to said respective second positions whereupon gas and lubricant flow from said gas and lubricant outlet conduit means respectively and said predetermined pressure on said valve means is released causing same to close and said gas in said lower portion of said chamber to vent through said venting means, flow of gas through said gas outlet conduit means causing gas to flow to said upper portion of said chamber to produce said reverse force to move said Belleville spring washer and said piston to said second position.

13. A valve comprising in combination a valve body having a bore therein, a piston in said bore having first and second end portions and movable between first and second positions, fluid inlet and outlet conduit means communicating with said bore, material inlet and outlet conduit means communicating with said bore, said piston in said first position preventing communication between said fluid inlet and outlet conduit means and between said material inlet and outlet conduit means, said piston in said second position permitting communication between said fluid inlet and outlet conduit means and between said material inlet and outlet conduit means, wall means defining a chamber adjacent said piston, a spring member connected to said piston, wall means dividing said chamber into first and second portions, said spring member having the characteristic of being movable from a first to a second position by the exertion of a force thereon and remaining there until the application of a reverse force to move it back from said second to said first position, passageway means from said fluid outlet conduit means to said second portion of said chamber, a conduit providing communication between said first portion of said chamber and said fluid inlet, valve means normally closed to prevent communication through said conduit, said valve means being openable to permit flow of fluid to said first portion of said chamber, fluid pressure in said first portion of said chamber urging said piston and spring member from their first to second positions and fluid pressure in said second portion of said chamber urging said piston and spring member from their second to first positions.

14. A spray valve comprising in combination a valve body having a bore therein, a piston in said bore having first and second end portions and movable between first and second positions, fluid inlet and outlet conduit means communicating with said bore, material inlet and outlet conduit means communicating with said bore, said piston in said first position preventing communication between said fluid inlet and outlet conduit means and between said material inlet and outlet conduit means, said piston in said second position permitting communication between said fluid inlet and outlet conduit means and between said material inlet and outlet conduit means, wall means defining a chamber at said first end portion of said piston, a spring member in said chamber, said spring member being connected to said first end portion of said piston and being movable therewith, said first end portion of said piston and said spring member dividing said chamber into first and second portions, said spring member having the characteristic of being movable from a first to a second position by the exertion of a force thereon and remaining there until the application of a reverse force to move it back from said second to said first position, passageway means from said fluid outlet conduit means to said first portion of said chamber, a conduit providing communication between said second portion of said chamber and said fluid inlet, valve means normally closed to prevent communication through said conduit, said valve means being opened upon a predetermined pressure in said material inlet conduit means which permits flow of fluid to said second portion of said chamber which produces said force to move said spring member and said piston to said respective second positions whereupon fluid and material may flow from said fluid and material outlet conduit means respectively and the predetermined pressure on said valve means is released causing same to close, flow of fluid through said fluid outlet conduit means causing fluid to flow to said first portion of said chamber to produce said reverse force to move said spring member and said piston to said second position.

15. A valve comprising a body having first and second end portions and having a bore therein, a piston member residing within said bore and having first and second end portions, said piston member movable between a first and a second position, a gas inlet connected to said bore, a gas outlet connected to said bore, said piston member in said first position prohibiting passage of gas from said gas inlet to said gas outlet and in said second position permitting passage of gas, a dispensable material inlet connected to said bore and providing communication with said piston member, a dispensable material outlet connected to said bore, said piston member in said first position prohibiting communication between said dispensable material inlet and said dispensable material outlet and in said second position permitting communication therebetween, wall means at said second end portion of said body forming a chamber, passageway means extending between said gas outlet and said chamber, a spring member residing within said chamber and cooperating with said piston member to move the same, said spring member having the characteristic of being movable from a first to a second position by the exertion of a force thereon and remaining there until the application of a reverse force to move it from said second to said first position, means for urging dispensable material into said dispensable material inlet and thereby exerting a control force to cause said piston member to be moved to said second position along with movement of said spring member from said first to said second position whereby dispensable material travels through said dispensable material outlet and gas flows from said gas inlet to said gas outlet and through said passageway means to said chamber, de-actuation of said means for urging dispensable material causing said control force to be removed whereby gas pressure in said chamber and said spring member moves said piston member back to said first position along with movement of said spring member back to said first position whereby gas is prevented from passing through said gas inlet to said gas outlet.

16. A valve comprising a body having first and second end portions and having a bore therein, a piston member residing within said bore and having first and second end portions, said piston member movable between a first and a second position, a gas inlet connected to said bore, a gas outlet connected to said bore, said piston member in said first position prohibiting passage of gas from said gas inlet to said gas outlet and in said second position permitting passage of gas, a dispensable material inlet connected to said bore and providing communication with said piston member, a dispensable material outlet connected to said bore, said piston member in said first position prohibiting communication between said dispensable material inlet and said dispensable material outlet and in said second position permitting communication therebetween, wall means at said second end portion of said body forming a chamber, passageway means extending between said gas outlet and said chamber, piston control means including a spring member residing within said chamber and cooperating with said piston member to move the same, said piston control means having the characteristic of being movable from a first to a second position by the exertion of a force thereon and remaining there until the application of a reverse force to move it from said second to said first position, means for urging dispensable material into said dispensable material inlet and thereby exerting a control force to cause said piston member to be moved to said second position along with movement of said piston control means from said first to said second position whereby dispensable material travels through said dispensable material outlet and gas flows from said gas inlet to said gas outlet and through said passageway means to said chamber, de-actuation of said means for urging dispensable material causing said control force to be removed whereby gas pressure in said chamber and said piston control means moves said piston member back to said first position along with movement of said piston control means back to said first position whereby gas is prevented from passing through said gas inlet to said gas outlet.

References Cited in the file of this patent

UNITED STATES PATENTS

| | | |
|---|---|---|
| 657,891 | Donnelly | Sept. 11, 1900 |
| 1,187,595 | Ahlheim | June 20, 1916 |
| 1,606,828 | Early | Nov. 16, 1926 |
| 1,864,250 | Lucas | June 21, 1932 |
| 2,332,630 | Fawkes | Oct. 26, 1943 |
| 2,521,891 | Beams | Sept. 12, 1950 |
| 2,704,548 | Ralston | Mar. 22, 1955 |
| 2,782,798 | Ericson | Feb. 26, 1957 |
| 2,792,916 | Williams | May 21, 1957 |
| 2,806,654 | Daly | Sept. 17, 1957 |

FOREIGN PATENTS

| | | |
|---|---|---|
| 319,323 | France | July 19, 1902 |